US011922292B2

United States Patent
Norrie et al.

(10) Patent No.: US 11,922,292 B2
(45) Date of Patent: Mar. 5, 2024

(54) SHARED SCRATCHPAD MEMORY WITH PARALLEL LOAD-STORE

(71) Applicant: Google LLC, Mountain View, CA (US)

(72) Inventors: Thomas Norrie, Mountain View, CA (US); Andrew Everett Phelps, Middleton, WI (US); Norman Paul Jouppi, Palo Alto, CA (US); Matthew Leever Hedlund, Madison, WI (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 15/931,970

(22) Filed: May 14, 2020

(65) Prior Publication Data

US 2021/0232898 A1 Jul. 29, 2021

Related U.S. Application Data

(60) Provisional application No. 62/966,518, filed on Jan. 27, 2020.

(51) Int. Cl.
G06N 3/063 (2023.01)
G06F 9/54 (2006.01)
(Continued)

(52) U.S. Cl.
CPC ............. G06N 3/063 (2013.01); G06F 9/544 (2013.01); G06F 13/16 (2013.01);
(Continued)

(58) Field of Classification Search
CPC ...... G06N 3/063; G06F 2213/28; G06F 17/16
See application file for complete search history.

(56) References Cited

U.S. PATENT DOCUMENTS

| 5,752,067 A | 5/1998 | Wilkinson et al. |
| 5,870,619 A | 2/1999 | Wilkinson et al. |

(Continued)

FOREIGN PATENT DOCUMENTS

| EP | 0675450 | 1/1995 |
| JP | 2020-532780 A | 11/2020 |

OTHER PUBLICATIONS

Glaser, Hardware-Accelerated Energy-Efficient Synchronization and Communication for Ultra-Low-Power Tightly Coupled Clusters (Year: 2019).*

(Continued)

*Primary Examiner* — Abdullah Al Kawsar
*Assistant Examiner* — Tewodros E Mengistu
(74) *Attorney, Agent, or Firm* — Fish & Richardson P.C.

(57) ABSTRACT

Methods, systems, and apparatus, including computer-readable media, are described for a hardware circuit configured to implement a neural network. The circuit includes a first memory, respective first and second processor cores, and a shared memory. The first memory provides data for performing computations to generate an output for a neural network layer. Each of the first and second cores include a vector memory for storing vector values derived from the data provided by the first memory. The shared memory is disposed generally intermediate the first memory and at least one core and includes: i) a direct memory access (DMA) data path configured to route data between the shared memory and the respective vector memories of the first and second cores and ii) a load-store data path configured to route data between the shared memory and respective vector registers of the first and second cores.

24 Claims, 5 Drawing Sheets

(51) Int. Cl.
  *G06F 13/16* (2006.01)
  *G06F 15/80* (2006.01)
  *G06F 17/16* (2006.01)

(52) U.S. Cl.
  CPC ...... *G06F 15/8061* (2013.01); *G06F 15/8092* (2013.01); *G06F 17/16* (2013.01); *G06F 2213/28* (2013.01)

(56) References Cited

U.S. PATENT DOCUMENTS

| | | | | |
|---|---|---|---|---|
| 6,539,500 | B1* | 3/2003 | Kahle | G06F 11/3636 |
| | | | | 714/E11.212 |
| 7,196,708 | B2 | 3/2007 | Dorojevets et al. | |
| 9,836,412 | B2 | 12/2017 | McConnell | |
| 10,186,011 | B2 | 1/2019 | Nurvitadhi et al. | |
| 10,261,786 | B2* | 4/2019 | Lacy | G06F 13/4282 |
| 10,474,458 | B2 | 11/2019 | Kaul et al. | |
| 11,080,051 | B2* | 8/2021 | Kerr | G06F 12/0808 |
| 2018/0260220 | A1 | 9/2018 | Lacy | G06F 15/8053 |
| 2018/0315158 | A1* | 11/2018 | Nurvitadhi | G06F 9/3017 |
| 2018/0322387 | A1* | 11/2018 | Sridharan | G06N 3/084 |
| 2018/0336165 | A1* | 11/2018 | Phelps | G06F 9/30014 |
| 2019/0196831 | A1 | 6/2019 | Han et al. | |
| 2019/0303759 | A1 | 10/2019 | Farabet et al. | |
| 2019/0340486 | A1* | 11/2019 | Mills | G06F 7/5443 |
| 2020/0151088 | A1* | 5/2020 | Gu | G06N 7/005 |
| 2021/0191765 | A1* | 6/2021 | Bokam | G06F 30/20 |

OTHER PUBLICATIONS

Kandemir, Exploiting Shared Scratch Pad Memory Space in Embedded Multiprocessor Systems (Year: 2002).*

Hansen et al, "A shared scratchpad memory with synchronization support" IEEE, Oct. 2017, 6 pages.

Hussain et al, "A novel hardware support for heterogeneous multi-core memory system" Journal of Parallel and Distributed Computing, Mar. 2017, 19 pages.

PCT International Search Report and Written Opinion in International Application No. PCT/US2021/015097, dated May 21, 2021, 17 pages.

Extended European Search Report in European Application No. 21153767.5, dated Jul. 2, 2021, 11 pages.

International Preliminary Report on Patentability in International Appln. No. PCT/US2021/015097, dated Aug. 11, 2022, 10 pages.

* cited by examiner

SHARED SCRATCHPAD MEMORY WITH PARALLEL LOAD-STORE

CROSS REFERENCE TO RELATED APPLICATION

This application claims the benefit of U.S. Provisional Application No. 62/966,518, filed Jan. 27, 2020, the contents of which are incorporated by reference herein.

BACKGROUND

This specification generally relates to circuitry for a hardware circuit used to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters. Some neural networks are convolutional neural networks (CNNs) configured for image processing or recurrent neural networks (RNNs) configured for speech and language processing.

A neural network layer of a CNN can have an associated set of kernels, which may correspond to parameters or weights. The associated set of kernels are used to process inputs (e.g., a batch of inputs) through the neural network layer to generate a corresponding output of the layer for computing a neural network inference. A batch of inputs and a set of kernels can be represented as a tensor of inputs and weights, respectively. The tensor can correspond to a multi-dimensional array. A hardware circuit that implements a neural network includes memory with locations that are identified by an address value. The memory locations can correspond to elements of a tensor and the tensor elements may be traversed or accessed using control logic of the circuit. For example, the control logic can determine or compute a memory address value of an element to load or store the corresponding data value of the element.

SUMMARY

This document describes a hardware circuit with an improved architecture that incorporates resources of a static random access memory (SRAM) that are allocated for sharing amongst multiple respective processor cores of the circuit. More specifically, the circuit includes a shared memory that can be located generally intermediate a high-bandwidth memory (HBM) and at least two processor cores of a special-purpose processor. The shared memory includes resources such as memory banks and registers that are physically and logically arranged with respect to certain computational resources of the processor cores. The physical and logical arrangement of the shared memory resources allow for increased speed and throughput during data communications between the HBM and respective processor cores of the hardware circuit as well as between distinct resources of a single processor core or between respective resources of two distinct processor cores.

One aspect of the subject matter described in this specification can be embodied in a circuit configured to implement a neural network that includes multiple neural network layers. The circuit includes: a first memory configured to provide data for performing computations to generate an output for a layer of the neural network; a first processor core that includes a first vector memory configured to store first vector values derived from the data provided by the first memory; a second processor core that includes a second vector memory configured to store second vector values derived from the data provided by the first memory; and a shared memory disposed intermediate the first memory and at least one processor core. The shared memory includes: a direct memory access (DMA) data path configured to route data communications between the shared memory and the first vector memory or the second vector memory; and a load-store data path configured to route data communications between the shared memory and a respective vector register of the first processor core or the second processor core.

These and other implementations can each optionally include one or more of the following features. For example, in some implementations, the circuit includes multiple processor cores, the first processor core and the second processor core being among the multiple processor cores; and the shared memory includes multiple memory resources that are physically distributed about the circuit to exchange data communications with each of the multiple processor cores at the circuit.

In some implementations, the shared memory includes a shared memory control unit configured to: execute software instructions that cause a first portion of the multiple memory resources to function as a DMA memory unit operable to move data between the first memory and each of the first processor core and the second processor core. The multiple memory resources includes a second portion of resources that are configured to: receive data values that are routed along the load-store data path; and temporarily store the data values for a threshold number of processor cycles.

The second portion of resources can be configured to: provide the data values to the respective vector register of the first processor core or the second processor core in response to temporarily storing the data values for the threshold number of processor cycles. In some implementations, the shared memory includes: a software-controlled staging resource that is formed from a subset of memory resources of the shared memory, the software-controlled staging resource is used to manage the flow of data values from the first memory to the respective vector register of the first processor core or the second processor core.

In some implementations, the circuit includes a matrix computation unit configured to perform a subset of the computations to generate accumulated values that are used to generate the output for the layer of the neural network. The software-controlled staging resource can be used to manage the flow of data corresponding to vector arrays from the first memory to the matrix computation unit, wherein the vector arrays are derived from the data values provided by the first memory. In some implementations, the circuit includes a vector processing unit that communicates with the first memory; the vector processing unit is configured to generate a vector of activation values from accumulated values generated at the circuit; and the vector of activation values corresponds to the output for the layer of the neural network.

The software-controlled staging resource can be a first-in-first-out (FIFO) memory structure along a load section of the load-store data path; and the FIFO memory structure is configured to temporarily store a vector of values for a threshold number of processor cycles before routing the vector of values to the respective vector register of the first processor core or the second processor core. In some implementations, the shared memory is configured to function as a shared-global memory space including memory resources corresponding to memory banks that are shared between one or more processor cores of the multiple processor cores.

In some implementations, the data for performing computations to generate the output for the first layer includes: inputs to be processed through the first layer of the neural network; a respective set of weights for the first layer of the neural network; and instructions for processing one or more of the inputs through the first layer using the respective set of weights for the first layer to generate the output for the first layer.

One aspect of the subject matter described in this specification can be embodied in a method for performing computations to generate an output for a layer of a neural network including multiple neural network layers using a circuit configured to implement the neural network. The method includes: providing, from a first memory, data used to generate an output for a neural network layer; and storing vectors of values at a first processor core of the circuit using a first vector memory of the first processor core, wherein the first vector memory is configured to store first vector values derived from the data provided by the first memory.

The method further includes routing, using a direct memory access (DMA) data path of a shared memory in the circuit, data communications including at least the first vector values between the shared memory and the first vector memory; routing, using a load-store data path of the shared memory, data communications including second vector values between the shared memory and a respective vector register of the first processor core; and generating, by a matrix computation unit, accumulated values corresponding to the output for the neural network layer using the respective first and second vector values that are routed to the matrix computation unit in parallel along the respective load-store data path and the DMA data path of the shared memory.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages.

The shared memory provides a memory construct that can be shared efficiently between two or more processor cores of a hardware circuit to improve acceleration and concurrent execution of neural network computations at the hardware circuit, relative to prior approaches. The shared memory can be structured to have certain resources reside substantially outside of the processor cores such that some (or all) of the wires that move data for direct memory accesses and load/store operations from the shared memory into the processor cores are shared. This improves bandwidth utilization and efficiency over other approaches that require dedicated wires for various data transfers.

The shared memory incorporates a load-store data path that provides higher peak performance since it does not require routing data through vector memory macros to load/write vector arrays to memory locations of an on-chip vector register. Using the improved architecture and resources of the shared memory, loads and stores against the vector registers can be executed in parallel to vector memory loads and stores due to additional available register ports that may be integrated at the vector registers.

The circuit architecture and techniques can be used to integrate and efficiently structure shared SRAM resources of a neural network processor into a single circuit package. The integration and efficient structuring of the shared SRAM resources allows for inferences to be computed without incurring penalties of off-chip communications to obtain additional data values.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a hardware circuit and data processing techniques that are implemented using an architecture of the hardware circuit that is improved relative to prior designs. The hardware circuit can be a special-purpose processor, such as a neural network processor, an application specific integrated circuit (ASIC), or a hardware accelerator. The hardware circuit is configured to implement a neural network that includes multiple neural network layers. The improved architecture and data processing techniques described in this document allow a circuit representing a hardware accelerator to realize increases in speed and bandwidth when accelerating computations of an example neural network model, including computations to process inputs through layers of a CNN, RNN, or other type of neural network to generate outputs corresponding to a neural network inference.

The circuit generally includes a first memory, respective first and second processor cores, and a shared memory. The first memory provides data for performing computations to generate an output for a neural network layer. Each of the first and second processor cores can be tensor processor cores that are configured to perform neural network computations using inputs and weights derived from the data provided by the first memory. For example, the first and second processor cores can execute the neural network computations using vectors of inputs and vectors of weights that are derived respectively from a corresponding input tensor and weight/parameter tensor provided by the first memory.

Each of the first and second cores include a respective vector memory configured to store vector values that are passed to the vector memory. The vector values are derived from the data provided by the first memory and are passed to the vector memories via the shared memory. The shared memory is disposed generally intermediate the first memory and at least one of the processor cores. The shared memory includes: i) a direct memory access (DMA) data path configured to route data between the shared memory and the respective vector memories of the first and second cores and ii) a load-store data path configured to route data between the shared memory and respective vector registers of the first and second cores. The combination of the DMA data path and load-store data path allow for increased bandwidth relative to prior designs by providing parallel data paths that can be used concurrently to provide vector values to computational arrays of the circuit that execute the neural network computations.

Figure 1:
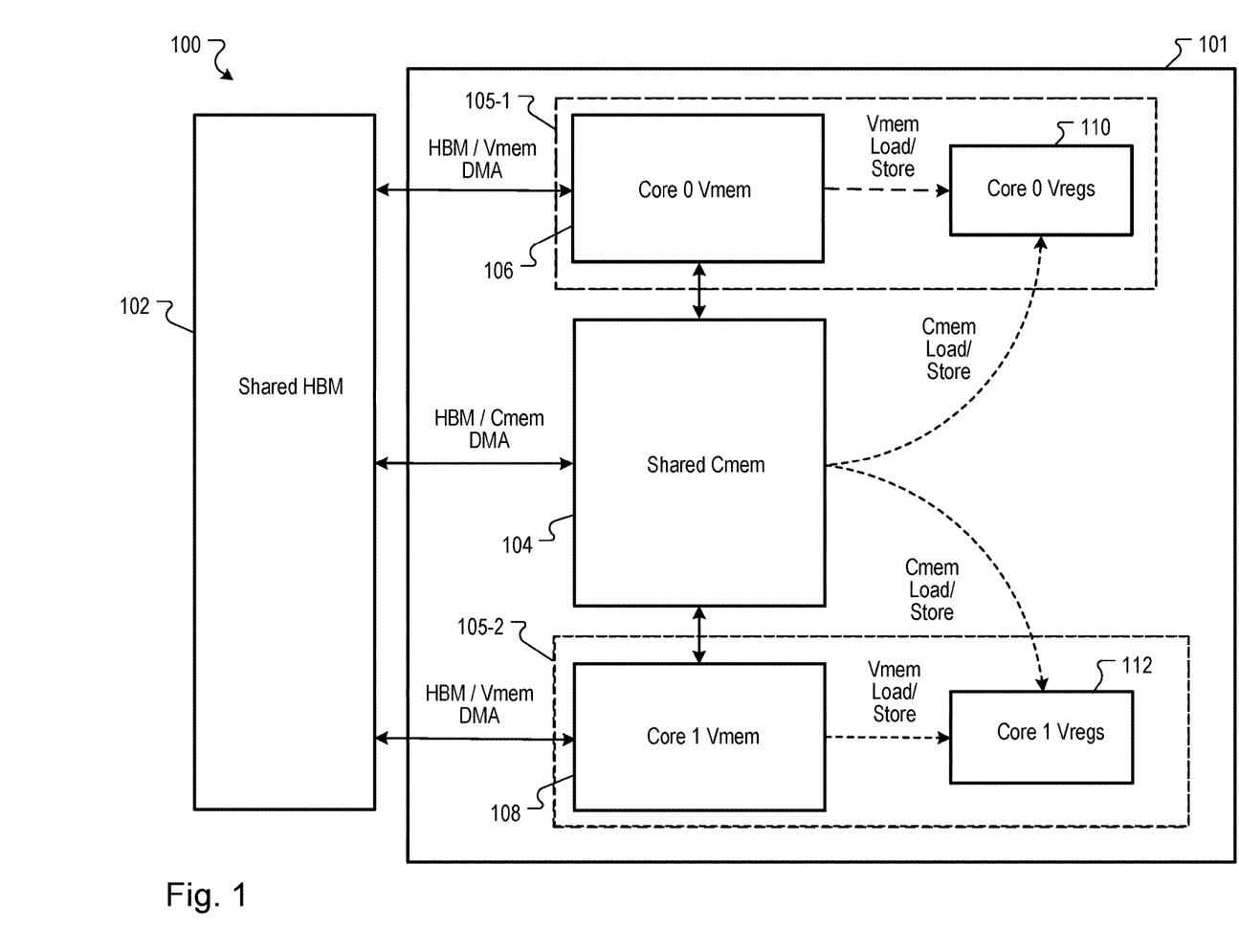
FIG. 1 is a block diagram of a computing system with a hardware circuit that includes an example shared memory.

FIG. 1 is a block diagram of a computing system 100 that includes an example hardware circuit 101. As noted above, the hardware circuit 101 can represent a hardware accelerator or some other special-purpose processor. In some cases, the system 100 is an example computing system for accelerating tensor or neural network computations associated with artificial deep neural networks (DNNs), such as RNNs or CNNs. For instance, system 100 is configured to implement a CNN on an example hardware accelerator and pass data values to the hardware accelerator to generate outputs for computing an inference.

In some implementations, system 100 is a system-on-chip. For example, the system-on-chip can include hardware circuit 101 and some (or all) of the other components and devices that are described in this document as being included in system 100.

The hardware circuit 101 may be a hardware accelerator configured to accelerate execution and/or performance of a neural network model. For example, execution of the neural network model may be accelerated relative to execution of the model on an example general-purpose machine, such as a central processing unit (CPU). Similarly, performance and execution of the neural network model may be accelerated relative to implementation of the model on another hardware accelerator, such as a graphics processing unit (GPU), which does not have the improved hardware features and techniques described in this specification.

The system 100, including the circuit 101, includes a system memory 102 and a shared memory 104. The system memory 102 can represent a high-bandwidth memory ("HBM 102") or an input/output (I/O) device that exchanges data communications with a processor core 105-1, 105-2, of the hardware circuit 101. The data communications can generally include writing data values to a vector memory 106, 108 located in a particular processor core 105-1, 105-2 or reading data from the vector memory 106, 108 of the particular processor core. For example, the HBM 102 may exchange data communications with processor core 105-1 to pass inputs to the core and to receive outputs generated by one or more computing resources of the core. In some implementations, the system memory 102 represents different types of memory systems and memory technologies, including HBM, DRAM, DIMMS, or non-DRAM technologies.

The data values can represent vector elements or arrays of vector values. For example, a first vector array can represent a batch of inputs to be processed through a neural network layer, whereas a second vector array can represent a set of weights for the layer. Relatedly, a third vector array can represent a vector of accumulated values that correspond to an output generated at processor core 105-1, whereas a fourth vector array can represent a vector of activation values that represent an output generated at processor core 105-2.

HBM 102 can be dynamic random access memory (DRAM) assets of system 100. In some implementations, HBM 102 is an external or off-chip memory relative to circuit 101 and is configured to exchange data communications with on-chip vector memory banks (described below) of system 100. For example, HBM 102 can be disposed at a physical location that is outside of an integrated circuit die that represents circuit 101. Hence, HBM 102 can be distant or non-local relative to computing resources disposed within the integrated circuit die. Alternatively, HBM 102, or portions of its resources, can be disposed within the integrated circuit die representing circuit 101 such that the HBM 102 is local to or co-located with computing resources of the circuit.

The system 100 can include one or more processor cores 105-1, 105-2. In some implementations, the system 100 includes multiple processor cores 105-n, where n is an integer greater than or equal to one. In the example of FIG. 1, as well as FIG. 2 and FIG. 3 described below, system 100 is shown as including two processor cores; however system 100, including the hardware circuit 101 described herein, may have more or fewer processor cores. In some examples, the described techniques relating to the shared memory 104, including its memory resources and the different data paths, can be shared with respect to components and resources of a single processor core. In general, a processor core 105-n is a discrete, self-contained processing/computing unit of the system 100 (or hardware circuit 101).

Each processor core 105 is configured to independently execute computations (e.g., neural network computations) required by one or more layers of a multi-layer neural network. The computations may be required to process data for a machine-learning workload or to execute specific tasks of the workload. Computations performed at a processor core to process inputs through one or more neural network layers may include a multiplication of a first set of data values (e.g., inputs or activations) with a second set of data values (e.g., weights). For example, the computation can include multiplying an input or activation value with a weight value on one or more cycles and performing an accumulation of products over many cycles. Each core 105 can generally include a matrix computation unit, and optionally a vector processing unit, that are used to perform these computations. These units are described in more detail below with reference to FIG. 3.

The different values in the first and second sets of data values are stored at specific memory locations of a memory construct in a processor core of the hardware circuit 101. In some implementations, individual values in the first set of data values may correspond to respective elements of an input tensor, whereas individual values in the second set of data values may correspond to respective elements of a weight (or parameter) tensor. As an example, a neural network layer in a sequence of layers can process a set of inputs, such as inputs of image pixel data or activation values generated by another neural network layer in the sequence of layers.

The set of inputs or set of activation values can be represented as a one dimensional (1D) or multi-dimensional tensor (e.g., 2D or 3D) with multiple elements along its respective dimensions. Each of the memory locations that store a data value can be mapped to a corresponding element of a single or multi-dimensional tensor and the tensor elements may be traversed or accessed using control logic of the circuit. For example, the control logic can determine or compute a memory address value mapped to an element to load or store the corresponding data value of the element.

The hardware circuit 101 has a specialized memory hierarchy that includes different memory constructs. Each of these memory constructs have varying bandwidth and latency properties relative to other constructs and may also vary in their physical placement within the hardware circuit 101. Example memory constructs include the shared memory 104, vector memory 106, 108, and vector register 110, 112. In general, the memory constructs are operable to store data values, such as vector values pertaining to inputs, activations, or gain values, to be processed at a neural network layer, and output activations generated by a neural network layer in response to processing inputs or activations through the layer. The generating and storing of output activations as well as the various memory constructs used to perform these operations are described in more detail below with reference to FIG. 2 and FIG. 3.

Figure 2:
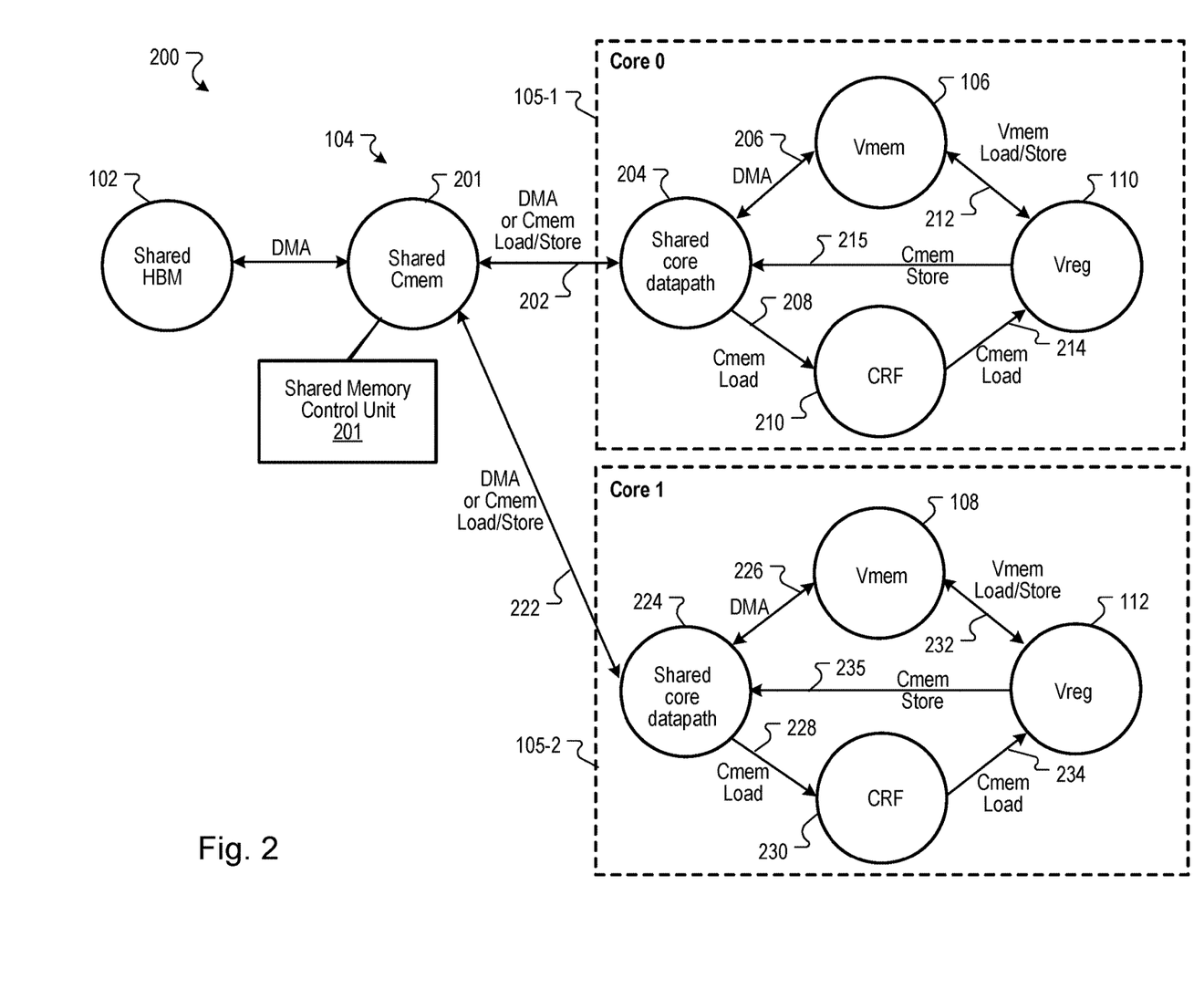
FIG. 2 is a block diagram showing example processor cores that communicate with the example shared memory of a hardware circuit.

FIG. 2 is a block diagram 200 that shows examples of how resources or sections of shared memory 104 are arranged at hardware circuit 101 to facilitate data communications between various components of the hardware circuit. As indicated above, the shared memory 104 provides a basis for the improved hardware architecture and data processing techniques of system 100. The shared memory 104 can represent on-chip SRAM resources of an example neural network processor chip. In some implementations, the shared memory 104 exists between (e.g., generally or substantially between) HBM 102 and a respective vector memory 106, 108 of a corresponding processor core 105-1, 105-2.

The shared memory 104 can represent a shared central space on the chip or circuit 101. For example, shared memory 104 is configured to function as a shared-global memory space that includes memory resources corresponding to memory banks and registers that are shared between one or more processor cores 105-1, 105-2, among multiple processor cores that may be present in system 100 and/or included at hardware circuit 101. As described in more detail below, the shared memory 104 is configured to function as a software-controlled scratchpad memory. In some implementations, some (or all) of the resources of shared memory 104 are configured to function as a software-controlled scratchpad (staging resource) rather than a hardware managed cache. In other implementations, some memory resources of shared memory 104 are configured to function, or operate, as a hardware-managed cache, concurrent with some memory resources (e.g., the remainder of resources) of shared memory 104 being configured to function as a software-controlled scratchpad. For example, system 100 can allocate a portion of resources that are allowed to operate as a hardware-managed cache, while using the rest of shared memory 104 as a software-scratchpad.

The system 100 is configured to expose at least two programming interfaces to a user for leveraging the data transfer functions afforded by shared memory 104. A first interface exposes programmable DMA data transfer functions and operations, whereas a second, different interface exposes programmable load/store data transfer functions and operations. Each of these interface functions represent logical attributes of shared memory 104 that are described in more detail below.

As noted above, memory constructs of system 100 have varying bandwidth and latency properties. For example, the shared memory 104 may have higher bandwidth and lower latency than DRAM accesses of HBM 102, but lower bandwidth and higher latency than accesses to vector memory 106, 108. In some examples, shared memory 104 has a lower data capacity than DRAM assets of the HBM 102, but a higher data capacity than the respective vector memories of the processor cores. In general, these varying bandwidth and latency properties are representative of standard memory hierarchy tradeoffs.

Memory constructs of system 100, particularly shared memory 104, may also vary in their physical placement within hardware circuit 101. The shared memory 104 includes resources such as memory banks and registers that may be physically and logically arranged with respect to the placement of certain computational resources of the processor cores 105-1, 105-2. In this context, the shared memory 104 may be characterized generally with reference to its physical structure and its logical structure. The physical structure of shared memory 104 will be discussed initially, whereas its logical structure is described below.

Regarding its physical structure, the resources of shared memory 104 may be physically distributed on hardware circuit 101. For example, different subsets, portions, or sections of resources that form the shared memory 104 may be physically distributed at various locations of the circuit 101 to enable different types of data transfer operations and processing techniques to be implemented at system 100. In some implementations, one section of resources of shared memory 104 can reside inside a processor core of the circuit 101, whereas another section of resources can reside outside of a processor core of the circuit 101. In the example of FIG. 2, a section of shared memory 104 is external to each of the processor cores 105-1, 105-2 to enable DMA operations that move large blocks of data between memory locations of HBM 102 and memory locations of shared memory 104.

Referring briefly again to HBM 102, this type of system memory can be an external memory structure used by system 100 to provide and/or exchange high bandwidth data with the vector memories of the respective processor cores. In some implementations, HBM 102 is configured for a variety of direct memory access (DMA) operations to obtain data from, or provide data to, memory address locations of the vector memory in processor cores of circuit 101. More specifically, DMA operations that involve HBM 102 exchanging data with the vector memories 106, 108 are enabled by an example control scheme and memory resources of shared memory 104.

Figure 3:
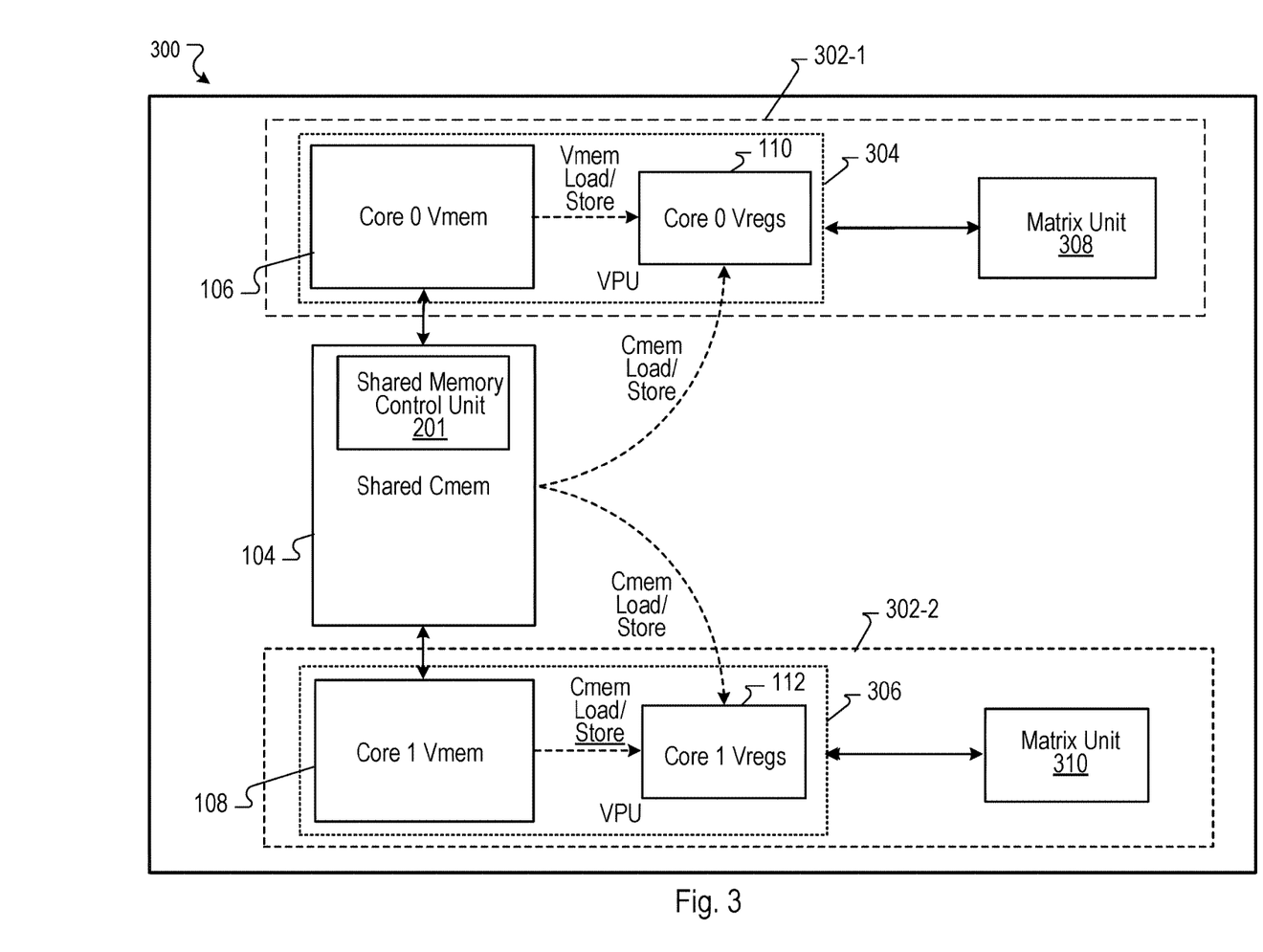
FIG. 3 is a block diagram showing example vector processors that communicate with an example matrix computation unit of a hardware circuit.

In the examples of FIG. 2, and FIG. 3 (described below), the shared memory 104 includes a shared memory control unit 201 ("control unit 201"). The control unit 201 is configured to generate control signals 114 for controlling memory access operations involving each of the HBM 102, shared memory 104, the vector memory 106, 108, and vector register 110, 112.

The control unit 201 implements a control scheme that is distributed across the different memories of system 100 (e.g., HBM 102, shared memory 104, vector memory 106, 108, and vector register 110, 112). In some implementations, this control implementation is distributed across the different memories based on communication between the control unit 201 and a respective control unit of each memory. For example, the control scheme can be distributed across the memories based on control signals provided by the control unit 201 that are processed locally by the respective control units of these different memories.

The sharing of data paths can be used to move data between the HBM 102 and the respective vector memory of the processor cores 105-1, 105-2. When this occurs, the system 100 causes any (and all) required control units for a given memory or data path to be activated to manage data hand-offs that need to occur at the appropriate touch points. The control unit 201 is configured to execute software instructions and generate control signals that cause a first portion of the memory resources of the shared memory 104 to function as a DMA memory unit.

The first portion of resources can be represented by shared core data path 204 with reference to processor core 105-1 and shared core data path 224 with reference to processor core 105-2. This representative DMA memory unit is operable to move data between the HBM 102 and each of the first processor core 105-1 and the second processor core 105-2 based on control signals generated by the control unit 201.

For example, the control signals can be generated to execute a DMA operation to move blocks of data (e.g., a vector) between: a) memory locations of shared memory 104 and vector memory 106 using data path 202, shared core data path 204, or data path 206 and b) memory locations of shared memory 104 and vector memory 108 using data path 222, shared core data path 224, or data path 226. In some implementations, the shared memory 104 may be referred to alternatively as shared CMEM 104.

As used in this document, CMEM generally corresponds to blocks of physically contiguous memory (CMEM) that provide useful configurations as data buffers and on-chip SRAM storage. As described in more detail below, in system 100, blocks of CMEM resources are physically distributed at hardware circuit 101 and arranged for sharing between components of processor cores that may be configured as a hardware accelerator or other type of special-purpose processor. Each of the shared core data path 204 and 224 are example nodes that can indicate a static contention that may occur on the shared data paths for movement of vector data crossing these points in the system.

As shown in the example of FIG. 2, the hardware circuit 101 and system 100 is configured to include multiple load-store data paths 202, 206, multiple CMEM load data paths 208, 214, 228, 234, and multiple CMEM store data paths 215, 235. The hardware circuit 101 and system 100 also includes multiple shared staging blocks 210, 230 (described below). In the example of FIG. 2, each of data paths 202, 222, can be configured as a data path for routing data (e.g., vectors or scalar values) in response to executing a DMA operation, a data path for routing data in response to executing a CMEM load/store operation, or both. The DMA operations and data paths 202, 206, 222, and 226 that are supported by the shared memory 104 can be used to move data between different memory structures with reference to certain memory offsets and stride parameters.

For example, the system 100 is configured to use the shared memory 104 to execute a DMA operation that involves moving 1 megabyte of data from one set of memory locations to another set of memory locations and with offset 0x04. The shared memory 104 and system 100 are operable to support various stride functions when executing the DMA operations. For example, the DMA operation for moving 1 megabyte of data can include a stride operation to insert address spacing at every 200 kilobytes relative to the address base.

In some implementations, the stride operation is used to insert the address spacing based on a desired read sequence that will be later executed to read the 1 megabyte of data after the data is moved to its destination locations. For example, the 1 megabyte block of data may be stored based on a stride operation that corresponds to how data will be read or retrieved for processing at different layers of a neural network or across different sets of filters or weights for a particular neural network layer.

The control unit 201 of shared memory 104 is also configured to cause performance of various load-store operations. For example, the control unit 201 generates control signals to execute load-store operations that move various quantities of data (e.g., vectors or vector values) between: a) memory locations of shared memory 104 and memory locations of the shared staging block 210 using data path 202, shared core data path 204, or data path 208 (for a load operation at core 105-1) and b) memory locations of shared memory 104 and memory locations of the shared staging block 230 using data path 222, shared core data path 224, or data path 228 (for load operation at core 105-2).

Similarly, the control signals can be generated to execute load-store operations that move various quantities of data (e.g., vectors or vector values) between: a) memory locations of shared memory 104 and vector register 110 using data path 202, shared core data path 204, or data path 215 (for a store operation at core 105-1) and b) memory locations of shared memory 104 and vector register 112 using data path 222, shared core data path 224, or data path 235 (for store operation at core 105-2).

Referring now to the logical structure of shared memory 104, as noted above, the system 100 is configured to expose at least two programming interfaces to a user for leveraging the data transfer functions afforded by shared memory 104. At least one interface exposes programmable DMA functions and another interface exposes programmable CMEM load/store functions, where each can represent logical attributes of shared memory 104. For load/store purposes, the shared memory 104 is logically exposed as a parallel memory to vector memory 106, 108. In this manner, each load-store data path is operable to provide an additional (or parallel) data path for moving blocks of data or a particular piece of data through the memory systems, such as through the vector registers, of respective processor cores 105-1, 105-2, or multiple cores of circuit 101. For example, load-store operations may be executed against the memory resources of shared memory 104 concurrent with DMA operations.

More specifically, a DMA operation may be executed to move a vector of values between memory locations of shared memory 104 and vector memory 106 using the DMA data path 206, while a load-store operation is executed, concurrent with the DMA operation, to move a different vector of values between memory locations of shared memory 104 and shared staging block 210. Similar concurrent operations may occur in processor core 105-2 (or other cores) using the resources of processor core 105-2 that correspond to the resources of processor core 105-1.

Load/store operations that are performed using the CMEM resources of shared memory 104 can represent high performance functions of the shared memory 104, or a high performance methods of using shared memory 104, relative to DMA operations. In some implementations, the control unit 201 is configured to execute software instructions and generate control signals that cause a second portion of the memory resources of the shared memory 104 to function as a software-controlled staging resource that is used to perform the load/store operations.

The second portion of resources can be represented by shared staging block 210 with reference to processor core 105-1 and shared staging block 230 with reference to processor core 105-2. Hence, each of shared staging block 210, 230 can represent a software-controlled staging resource (or scratchpad) that is formed from a subset of memory resources of the shared memory 104. In some examples, the software-controlled staging resource of system 100 is configured to manage the flow of vector data values from the HBM 102 to the respective vector registers 110 or 112 of the first processor core 105-1 or the second processor core 105-2.

The shared memory 104 and its resources have a property of being uniquely configurable as a DMA memory, e.g., for moving data between memory constructs such as HBM 102 or vector memory 106, 108, but also a load/store memory for moving data directly into the respective vector registers 110, 112 on each processor core 105-1, 105-2. These configurable aspects of shared memory 104 allow its resources and addressing to be scheduled at fine granularity by software running on the core. For example, shared memory 104 can be a software managed (not hardware managed) SRAM resource, in which a compiler of a processor core manages the addressing of its memory specifically, including the types of data that may or may not be present at the memory address locations of shared memory 104.

In some implementations, the software-controlled staging resources of shared memory 104 are configured to as a first-in-first-out (FIFO) memory structure (e.g., shared staging block 210 or 230) along a load section of the load-store data path of processor core that includes CMEM store data path 215 or 235 for routing data for storage at shared CMEM 203 or HBM 102. The FIFO memory structure is configured to temporarily store a set of data values for a threshold number of processor cycles before routing the set of values to the respective vector register 110, 112 of the first processor core 105-1 or the second processor core 105-2. The FIFO memory structure is used to mitigate register pressure and scheduling complexity that might result from a CMEM load operation that has a particular load latency.

In some implementations, the threshold number of clock cycles is determined based on an example high latency (e.g., 50 cycles) CMEM load operation that is likely to cause register pressure and scheduling complexity associated with reserving a given register for the entire 50 cycles. To counteract or mitigate the concerns regarding register pressure, a CMEM Result FIFO ("CRF") is physically instanced at the hardware circuit 100 using resources of shared memory 104. In the example of FIG. 2, a first CRF is represented by staging block 210 of processor core 105-1, whereas a second CRF is represented by staging block 230. Each of the CRFs allow an example CMEM load operation to be broken into at least two phases: i) the CMEM to CRF phase, where the CMEM address information is provided, and ii) the CRF to register phase, where the vector register target is provided.

For example, each of shared staging block 210, 230, are configured to receive data values (e.g., scalar or vector values) and temporarily store the data values for a threshold number of processor cycles. In processor core 105-1, the data values are routed to shared staging block 210 along the load data path 208 (and shared core data path 204) that connects the staging block 210 to other memory locations of shared memory 104. In processor core 105-2, the data values are routed to shared staging block 230 along the load data path 228 (and shared core data path 224) that connects the staging block 230 to other memory locations of shared memory 104.

The shared staging block 210 is configured to provide the data values to the vector register 110 of the processor core 105-1 in response to temporarily storing the data values for the threshold number of processor cycles. Likewise, the shared staging block 230 is configured to provide the data values to the vector register 112 of the processor core 105-2 in response to temporarily storing the data values for the threshold number of processor cycles.

System 100 is configured to issue multiple CMEM load instructions on the same cycle. For example, system 100 can issue a CMEM load instructions that is performed using data path 208 (or 214) and shared staging block 210 and, on the same cycle, issue a load to vector memory 106 that is performed using the data path 212. In some examples, from the viewpoint of the software controls, a Cmem load operation that traverses the data path 214 between the resource 210 and the vector register 110 and a Vmem load operation that traverses the data path 212 between vector memory 106 and the vector register 110 can each issue and execute on the same cycle. In some implementations, the vector registers 110, 112 are adapted, relative to a prior design, to include additional ports that allow the vector registers 110, 112 to receive concurrent load operations.

For example, vector register 112 is configured to include additional ports that allow the register to receive respective vector payloads from vector memory 108 and shared staging block 230 during concurrent load operations that are executed at processor core 105-2. In some examples, a single piece of data for a payload that is loaded to each of vector registers 110, 112 involves 128 discrete loads based on the up to 128 data items that may be moved to vector register 110 or vector register 112 during a single load operation.

The CMEM load/store functionality of shared memory 104 can provide higher peak performance relative to prior designs, since it does not require routing data through vector memory macros. For example, the loads and stores (along data path 215, 235) can be executed in parallel to vector memory loads and stores due, in part, to the additional available register ports at the vector registers 110, 112.

In some implementations, system 100 includes an example load-store interface that provides a parallel interface into each of shard staging blocks 210, 230 that bypasses some (or all) of the bandwidth restrictions that may exist when traversing data paths through vector memory 106, 108. This example load-store interface can effectively provide for higher memory bandwidth that allows for extracting additional performance from an example workload. For example, system 100 is configured to perform various load/store operations using resources of shared memory 104 (e.g., the software-controlled staging resource), where the load/store operations may be performed to bypass moving data through the vector memory at a processor core.

For example, a component of hardware circuit 101 can communicate with shared memory 104 to read data from a single address location of a memory bank or register file of shared memory 104. In some examples, the data stored at a single address in the memory is read and that single piece of data may be moved into a register file or staging block located inside a processor core. For example, a single piece of data may be read from an address location of shared CMEM 104, moved through shared core data path 224, and moved into an address location of shared staging block 230 in processor core 105-2 for further processing. The operation may be performed to bypass moving the data through the memory system via vector memory 108, thereby conserving processor clock cycles at core 105-2 and bandwidth at data paths that connect to vector memory 108.

FIG. 3 is a block diagram showing example vector processors that communicate with an example matrix computation unit of hardware circuit 101. More specifically, in some implementations, an example tensor processor core 302-1 of hardware circuit 101 includes a vector processing unit 304 ("vector processor 304") and a matrix computation unit 308 that is coupled to the vector processor 304. Similarly, another tensor processor core 302-2 of hardware circuit 101 includes a vector processor 306 and a matrix computation unit 308 that is coupled to the vector processor 306.

In general, the hardware circuit 101 is configured to perform computations to generate an output for a neural network layer. Each of the matrix computation units 308 and 310 that are included at the circuit 101 are configured to perform a subset of the computations to generate accumulated values that are used to generate the output for the neural network layer. In some implementations, the software-controlled staging resource (e.g., staging blocks 210, 230) described above is configured to manage the flow of data corresponding to vector operands from the HBM 102 to each of matrix computation units 308, 310. In some cases, the operands are inputs and weights that are provided by HBM 102. The operands may be structured as vector arrays based on data operations performed using Arithmetic Logic Units (ALUs) of the vector processors 304 or 306.

In the example of FIG. 3, the control unit 201 generates control signals for managing operations to retrieve (or read) multiple batches of inputs and sets of weights from memory locations of shared memory 104, vector memory 106, 108, and vector register 110, 112. The retrieved inputs and weights may be processed through a neural network layer to compute accumulated values based on computations performed at the matrix computation unit 308, 310. The accumulated values may be processed at the vector processors 304, 306 to generate activation values that correspond to an output for the neural network layer. The control signals generated by the control unit 201 are used to store (or write) multiple sets of outputs or output activations generated by the vector processors 304, 306 to HBM 102 or other memory locations of hardware circuit 101 for processing at one or more other neural network layers.

Figure 4:
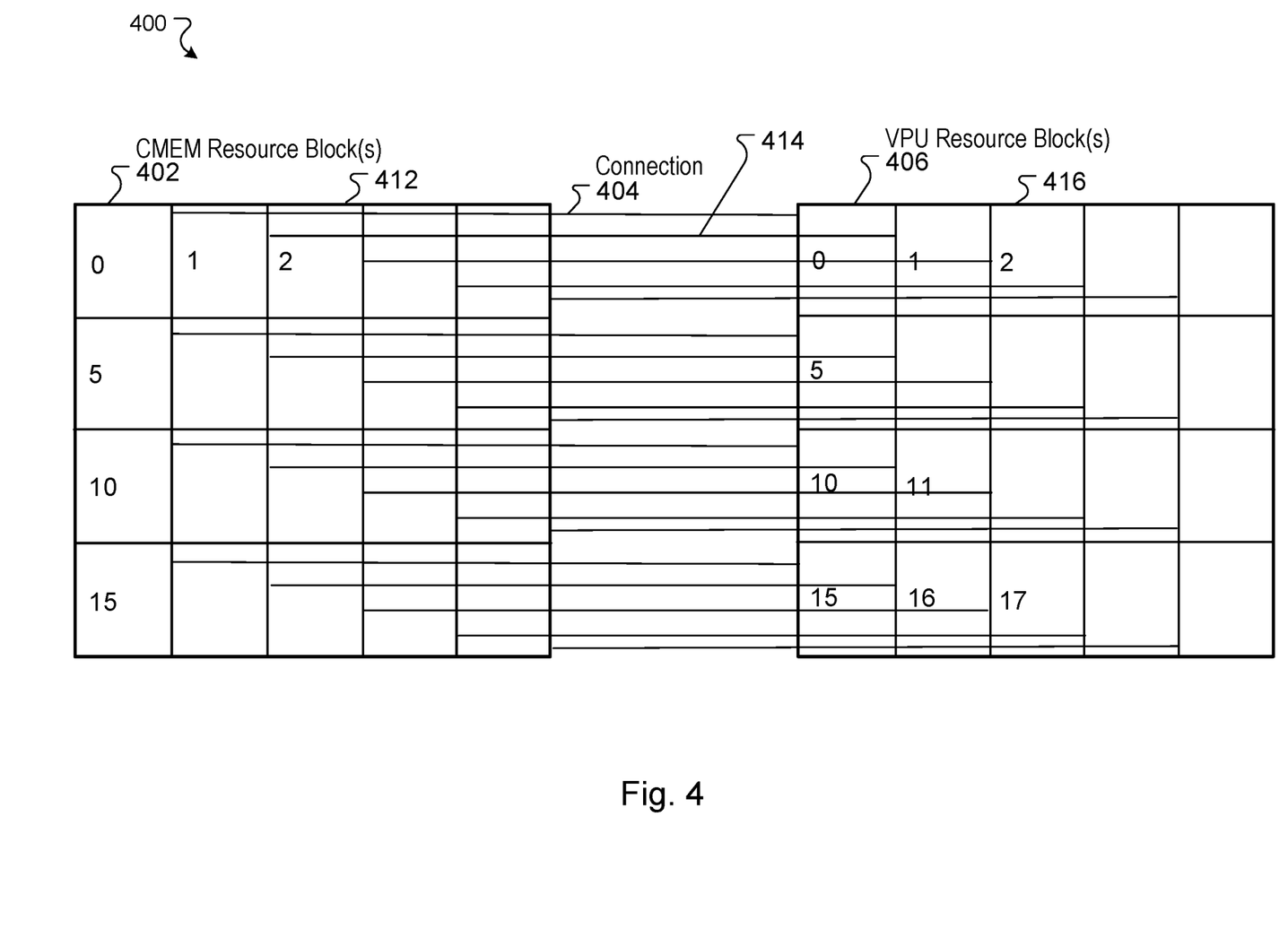
FIG. 4 illustrates example wire connections that couple a shared memory to one or more vector processors of a hardware circuit.

FIG. 4 illustrates example wired connections 400 that couple a shared memory 104 to one or more vector processors 304, 306 of a respective processor core 302-1, 302-2 at a hardware circuit 101. The wired connections 400 can represent a physical structure which imposes certain physical limitations that correspond to the total number of wired or data bus connections that may be available at a given hardware circuit. For example, a first block of CMEM resources 402 (bank_0) of shared memory 104 may be coupled, via wire connection 404, to a corresponding block of VPU resources 406. The VPU resources 406 are memory resources, e.g., a vector register or vector memory, of an example a vector processing unit such as vector processor 304 in processor core 302-1. Similarly, a second block of CMEM resources 412 (bank_1) of shared memory 104 may be coupled, via wire connection 414, to a corresponding block of VPU resources 416. The VPU resources 416 are memory resources, e.g., a vector register or vector memory, of an example a vector processing unit such as vector processor 306 in processor core 302-2. In some cases, a constraint that requires separation of CMEM resources and VPU blocks exists when a given block of CMEM resources is connected to a VPU block on two separate cores. In particular, this constraint requires that the CMEM and VPU blocks be separated across a physical space of a hardware circuit when the CMEM resources are configured for connecting to separate cores.

In some implementations, the shared memory 104 is of a given size and the resource blocks of shared memory 104 and processor resources must be present within certain physical areas of the chip or circuit 101. Example operations that involve moving data within a processor core or between processor cores require that the data be able to traverse some physical distance at the hardware circuit 101 within a threshold number of processor cycles. Since some portion of the resources of shared memory 104 reside outside of the cores 105-1, 105-2, and wires can be expensive to implement, the wires (e.g., wire connection 404, 414) that move data for a DMA operation and load/store operation from resources of shared memory 104 into a processor core 105 are shared. These wires may also be used for DMA operations between HBM 102 and vector memory 106, 108. This sharing of wired connections improves bandwidth utilization and efficiency.

In some implementations, to save on wiring in a way that is amenable to a particular workload, a data path that routes data from the shared CMEM 203 to a resource of the processor core can be 2× the width of a data path that routes data from a resource of the processor core to the shared CMEM 203. Accordingly, the techniques described in this document provide example hardware layout options that balance the complexities in achieving the logical advantages of shared memory 104 against certain physical constraints and limitations in the amount of wired connections and options for physical placement of hardware components at the circuit 101.

Figure 5:
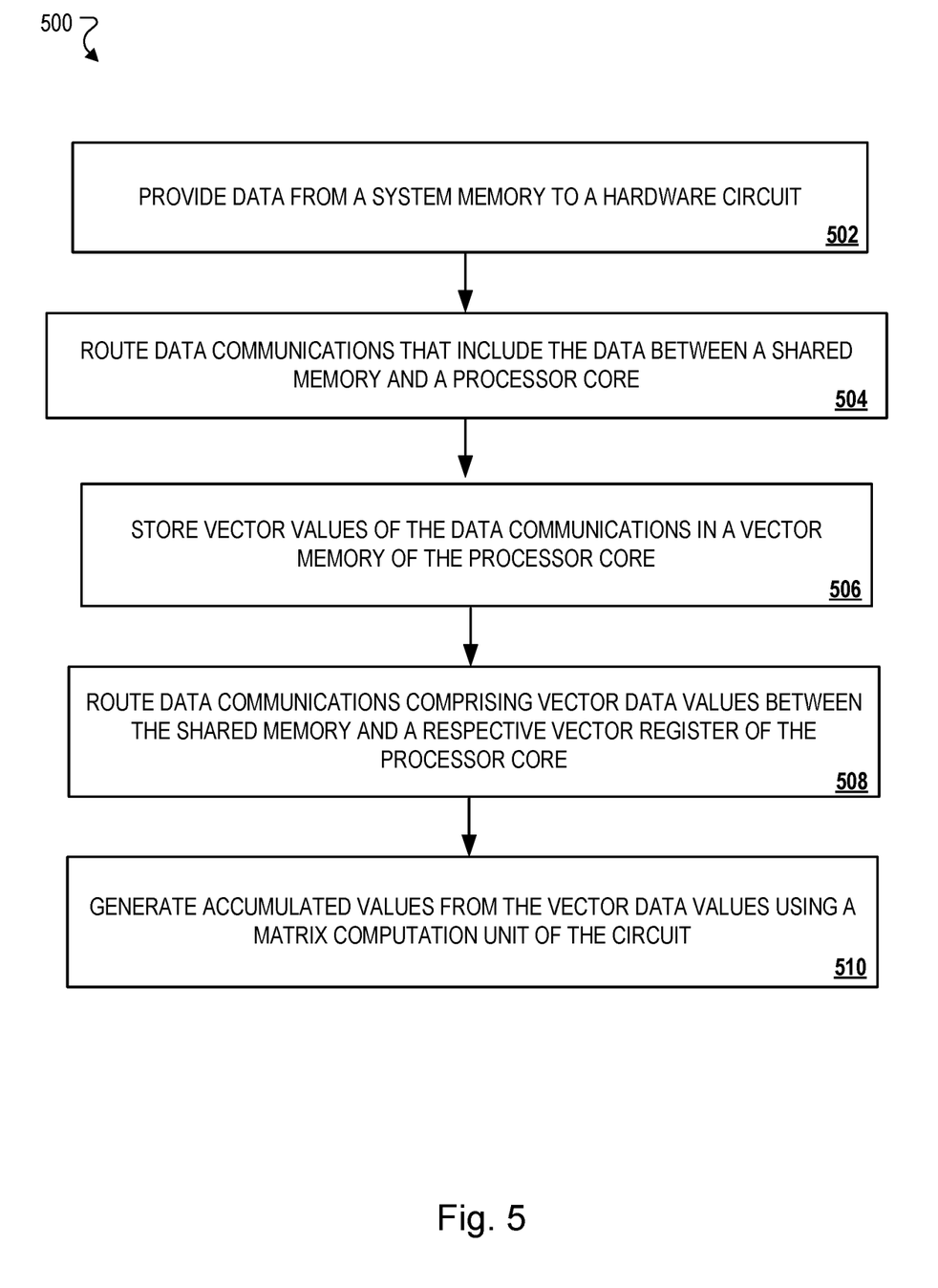
FIG. 5 is a flow diagram that illustrates an example process for accelerating neural network computations using the shared memory of FIG. 1.

FIG. 5 is a flow diagram that illustrates an example process 500 for accelerating neural network computations using the shared memory of FIG. 1. Process 500 can be implemented or executed using the system 100 described above. Descriptions of process 500 may reference the above-mentioned computing resources of system 100. The steps or actions of process 500 may be enabled by programmed firmware, or software instructions, that are executable by one or more processors of the devices and resources described in this document. In some implementations, the steps of process 500 correspond to a method for performing computations to generate an output for a neural network layer using a hardware circuit configured to implement the neural network.

Referring now to process 500, data is provided from a memory of the system 100 to a hardware circuit of the system (502). For example, the system 100 provides data from the HBM 102 to the hardware circuit 101. In some implementations, the data includes specific data values and instructions that are used to generate the output for a neural network layer. The HBM 102 can represent a system memory or an input/output (I/O) device that exchanges data communications with tensor processor cores of the hardware circuit 101. For example, the HBM 102 may exchange data communications with the tensor processor cores to pass inputs to the tensor cores and to receive outputs generated by the tensor cores.

The system 100 stores a vector of values at a first processor core of the circuit using a vector memory of the first processor core (504). For example, the system 100 can use memory address locations of the vector memory 106 located in the tensor processor core 105-1 to store an input vector corresponding to a batch of inputs to be processed at the neural network layer. The vector memory 106 is configured to store first vector values in response to the processor core 105-1 identifying or deriving the first vector values from the input data provided by HBM 102. In some implementations, the vector memory 106 stores the first vector values in response to the first processor core 105 determining that the data provided by the first memory includes a subset of vector values that are assigned to be stored in the vector memory 106.

The first vector values may be used directly from, or derived from, a set of elements among the various elements that represent data values of a multi-dimensional input tensor. As noted above, the multi-dimensional input tensor may be provided as input data from the HBM 102. In some implementations, the first vector values represent a set of weights for a neural network layer that are obtained, extracted, or otherwise derived from the data provided by the HBM 102. The first vector values may be stored in memory locations of the vector memory 106 in response to the values being routed to a vector processing unit 304 that includes the vector memory 106. Each of the vector processing unit 304 and vector memory 106 can be included as part of the processor core 105-1.

The data provided by the system memory is routed between a shared memory in the circuit and a vector memory of the circuit (506). For example, data communications that include the first vector values are routed between the shared memory 104 and the vector memory 106 of processor core 105-1 using at least the DMA data path 206 of the shared memory 104. More specifically, data communications that include the first vector values are initially provided by the HBM 102 and then routed between the shared memory 104 and vector memory 106 using a first portion of resources of the shared memory 104. In some instances, the first vector values are routed between the vector memory 106 and a particular section (or sub-section) of the shared memory 104.

The first portion of resources of the shared memory 104 is configured to function as a DMA memory unit that is operable to execute a DMA type operation to load data into the memory locations of the vector memory 106. The DMA type operation may be performed against the individual memory address locations of the first portion of resources to obtain arrays of vector values. The arrays of vector values are routed to the vector memory 106 using the DMA data path 206 of the shared memory 104.

The data provided by the system memory is routed between a shared memory in the circuit and a respective vector register of the circuit (508). For example, data communications that include second vector values are routed between the shared memory 104 and the vector register 110 of processor core 105-1 using at least the load-store data path 208, 214 of the shared memory 104. More specifically, data communications that include the second vector values are initially provided by the HBM 102 and then routed between the shared memory 104 and vector register 110 using a second portion of resources of the shared memory 104. In some instances, the second vector values are routed between the vector register 112 and a particular section (or sub-section) of the shared memory 104.

In some implementations, the second portion of resources of the shared memory 104 is configured as a software-controlled staging resource that is formed from a subset of memory resources of the shared memory 104. This software-controlled staging resource is configured to: i) receive data values (e.g., second vector values) that are routed along the load-store data path 208; ii) temporarily store the second vector values for a threshold number of processor cycles; and iii) provide the second vector values to a respective vector register 110 of at least processor core 105-1 in response to temporarily storing the vector values for the threshold number of processor cycles. The threshold number can be a software-defined threshold. For example, the threshold number can be specifically defined by the software when instructions are scheduled in an example instruction stream of a processor.

The shared memory 104 is operable to load arrays of vector values that correspond to the second vector values into memory locations of the staging resource that are included among the second portion of resources. A read operation may be performed against the individual memory address locations of the second portion of resources to obtain arrays of vector values corresponding to the second vector values. These vector arrays are routed to the vector register 110 using, for example, the load-store data path 214 of the shared memory 104. Alternatively, these vector arrays may be routed to the vector register 112 using the load-store data path 234 of the shared memory 104.

The system 100 generates accumulated values that correspond to the output for the neural network layer using sets of vector values (510). For example, the hardware circuit 101 includes a matrix computation unit 308 that is coupled to the vector processing unit 304 of processor core 105-1. The system 100 causes the matrix computation unit 308 to generate multiple accumulated values using the respective first and second vector values that are routed to the matrix computation unit 308. In some implementations, the first and second vector values are routed to the matrix computation unit 308 concurrently along different data paths of the circuit. For example, a set of first vector values and a set of second vector values can be routed to the matrix computation unit 308 in parallel using the load-store data path 214 and the DMA data path 206, respectively.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A circuit configured to implement a neural network comprising a plurality of neural network layers, the circuit comprising:
    a first memory configured to provide data for performing computations to generate an output for a layer of the neural network;
    a first processor core comprising:
        a first vector memory located within the first processor core and configured to store first vector values derived from the data provided by the first memory, and
        a first vector register located within the first processor core and configured to at least load data from or store data to the first vector memory;
    a second processor core comprising:
        a second vector memory located within the second processor core and configured to store second vector values derived from the data provided by the first memory, and
        a second vector register located within the second processor core and configured to at least load data from or store data to the second vector memory; and
    a shared memory disposed intermediate the first memory and at least one of the first processor core or the second processor core, wherein the shared memory and the first memory are communicatively coupled by direct memory access (DMA), wherein the shared memory comprises:
        a first direct memory access (DMA) data path configured to route data communications between the shared memory and the first vector memory included in the first processor core, a second direct memory access (DMA) data path configured to route data communications between the shared memory and the second vector memory included in the second processor core;
        a first load-store data path configured to route data communications between the shared memory and the first vector register included in the first processor core, and a second load-store data path configured to route data communications between the shared memory and the second vector register included in the second processor core;
        a software-controlled staging resource that is formed from a subset of memory resources of the shared memory, wherein the software-controlled staging resource is used to manage a flow of data values from the first memory to the first vector register of the first processor core or the second vector register of the second processor core,
        wherein the software-controlled staging resource is a first-in-first-out (FIFO) memory structure along a load section of the first load-store data path or the second load-store data path; and
        the FIFO memory structure is configured to temporarily store a vector of values received from other memory locations of the shared memory for a threshold number of processor cycles and to subsequently route the vector of values from the FIFO memory structure to the first vector register of the first processor core or the second vector register of the second processor core; and
    a matrix computation unit, within the first processor core or the second processor core, configured to perform a subset of the computations to generate accumulated values that are used to generate the output of the layer of the neural network, wherein the software-controlled staging resource is used to manage the flow of the data values corresponding to vector arrays between the first memory and the matrix computation unit, wherein the vector arrays are derived from the data values provided by the first memory.

2. The circuit of claim 1, wherein:
    the circuit comprises a plurality of processor cores, the first processor core and the second processor core being among the plurality of processor cores; and
    the shared memory comprises a plurality of memory resources that are physically distributed about the circuit to exchange data communications with each of the plurality of processor cores at the circuit.

3. The circuit of claim 2, wherein the shared memory comprises a shared memory control unit configured to:
    execute software instructions that cause a first portion of the plurality of memory resources to function as a DMA memory unit operable to move data between the first memory and each of the first processor core and the second processor core.

4. The circuit of claim 3, wherein the plurality of memory resources comprises a second portion of resources that are configured to:
    receive data values that are routed along the first or second load-store data path; and
    temporarily store the data values for a threshold number of processor cycles.

5. The circuit of claim 4, wherein the second portion of resources are configured to:
    provide the data values to the first vector register of the first processor core or the second vector register of the second processor core in response to temporarily storing the data values for the threshold number of processor cycles.

6. The circuit of claim 1, wherein:
    the circuit comprises a vector processing unit that communicates with the first memory;
    the vector processing unit is configured to generate a vector of activation values from accumulated values generated at the circuit; and
    the vector of activation values corresponds to the output for the layer of the neural network.

7. The circuit of claim 1, wherein the shared memory is configured to function as a shared-global memory space comprising memory resources corresponding to memory banks that are shared between one or more processor cores of a plurality of processor cores.

8. The circuit of claim 1, wherein the data for performing computations to generate the output for a first layer of the neural network comprises:
    inputs to be processed through the first layer of the neural network;
    a respective set of weights for the first layer of the neural network; and
    instructions for processing one or more of the inputs through the first layer using the respective set of weights for the first layer to generate the output for the first layer.

9. The circuit of claim 1, wherein the software-controlled staging resource is configured to load data from the shared memory in a first phase, and provide the loaded data to the first or second vector register in a second phase.

10. The circuit of claim 1, wherein each data path of the first and second DMA data paths and the first and second load-store data paths is assigned to a respective block of the shared memory of multiple blocks of the shared memory that are separated from one another.

11. A method for performing computations to generate an output for a layer of a neural network comprising a plurality of neural network layers using a circuit configured to implement the neural network, the method comprising:
providing, from a first memory, data used to generate an output for a neural network layer;
storing vectors of values at a first processor core of the circuit using a first vector memory of the first processor core, wherein the first vector memory is located within the first processor core and configured to store first vector values derived from the data provided by the first memory, and wherein the first processor core further comprises a first vector register located within the first processor core and configured to at least load data from or store data to the first vector memory;
storing vectors of values at a second processor core of the circuit using a second vector memory of the second processor core, wherein the second vector memory is located within the second processor core and configured to store second vector values derived from the data provided by the first memory, and wherein the second processor core further comprises a second vector register located within the second processor core and configured to at least load data from or store data to the second vector memory;
routing, using a first direct memory access (DMA) data path of a shared memory in the circuit, data communications comprising at least the first vector values between the shared memory and the first vector memory included in the first processor core, wherein the shared memory and the first memory are communicatively coupled by direct memory access (DMA);
routing, using a second direct memory access (DMA) data path of the shared memory in the circuit, data communications comprising at least the second vector values between the shared memory and the second vector memory included in the second processor core;
routing, using a first load-store data path of the shared memory, data communications comprising third vector values between the shared memory and the first vector register included in the first processor core;
routing, using a second load-store data path of the shared memory, data communications comprising fourth vector values between the shared memory and the second vector register included in the second processor core, wherein the shared memory further comprises a software-controlled staging resource that is formed from a subset of memory resources of the shared memory;
managing, using the software-controlled staging resource, data flows from the first memory to the first vector register of the first processor core and data flows from the first memory to the second vector register of the second processor core;
wherein the software-controlled staging resource is a first-in-first-out (FIFO) memory structure along a load section of the first load-store data path or the second load-store data path, and wherein the FIFO memory structure is configured to temporarily store a vector of values received from other memory locations of the shared memory for a threshold number of processor cycles and to subsequently route the vector of values from the FIFO memory structure to the first vector register of the first processor core or the second vector register of the second processor core; and
generating, by a matrix computation unit within the first processor core or the second processor core, accumulated values corresponding to the output for the neural network layer using the respective first and third vector values that are routed to the matrix computation unit in parallel along the first load-store data path and the first DMA data path of the shared memory, respectively, in response to performing a subset of the computations to generate the output for the neural network layer;
wherein the software controlled staging resource manages data flows between the first memory and the matrix computation unit, wherein the data flows comprise vector arrays that are derived from the data provided by the first memory.

12. The method of claim 11, wherein the circuit comprises a plurality of processor cores and the shared memory comprises a plurality of memory resources that are physically distributed about the circuit and the method comprises:
using the plurality of memory resources of the shared memory to exchange data communications between the first memory and each of the plurality of processor cores.

13. The method of claim 12, wherein the shared memory comprises a shared memory control unit and the method comprises:
causing a first portion of resources of the plurality of memory resources to function as a DMA memory unit based on instructions executed by the shared memory control unit; and
using a representative DMA function of the first portion of resources to move data between the first memory and each of the first processor core and the second processor core.

14. The method of claim 13, comprising:
receiving, by a second portion of resources of the plurality of memory resources, the third vector values and the fourth vector values that are routed along the first and second load-store data path respectively;
temporarily storing, using the second portion of resources, the third vector values for a threshold number of processor cycles; and
temporarily storing, using the second portion of resources, the fourth vector values for a threshold number of processor cycles.

15. The method of claim 14, comprising:
providing, using the second portion of resources, the third vector values to the first vector register of the first processor core in response to temporarily storing the third vector values for the threshold number of processor cycles; and
providing, using the second portion of resources, the fourth vector values to the second vector register of the second processor core in response to temporarily storing the fourth vector values for the threshold number of processor cycles.

16. The method of claim 11, wherein:
the circuit comprises a vector processing unit intermediate the first memory and the matrix computation unit;
the method comprises generating, by the vector processing unit, a vector of activation values from the accumulated values generated by the matrix computation unit; and
the vector of activation values corresponds to the output for the neural network layer.

17. The method of claim 11, wherein the software-controlled staging resource is configured to load data from the shared memory in a first phase, and provide the loaded data to the first or second vector register in a second phase.

18. A non-transitory machine-readable storage device for implementing a neural network having multiple neural network layers on a circuit used to perform neural network computations and for storing instructions that are executable by a processing device to cause performance of operations comprising:

providing, from a first memory, data used to generate an output for a neural network layer;

storing vectors of values at a first processor core of the circuit using a first vector memory of the first processor core, wherein the first vector memory is located within the first processor core and configured to store first vector values derived from the data provided by the first memory, wherein the first processor core further comprises a first vector register located within the first processor core and configured to at least load data from or store data to the first vector memory;

storing vectors of values at a second processor core of the circuit using a second vector memory of the second processor core, wherein the second vector memory is located within the second processor core and configured to store second vector values derived from the data provided by the first memory, wherein the second processor core further comprises a second vector register located within the second processor core and configured to at least load data from or store data to the second vector memory;

routing, using a first direct memory access (DMA) data path of a shared memory in the circuit, data communications comprising at least the first vector values between the shared memory and the first vector memory included in the first processor core, wherein the shared memory and the first memory are communicatively coupled by direct memory access (DMA);

routing, using a second direct memory access (DMA) data path of the shared memory in the circuit, data communications comprising at least the second vector values between the shared memory and the second vector memory included in the second processor core;

routing, using a first load-store data path of the shared memory, data communications comprising third vector values between the shared memory and the first vector register included in the first processor core;

routing, using a second load-store data path of the shared memory, data communications comprising fourth vector values between the shared memory and the second vector register included in the second processor core, wherein the shared memory further comprises a software-controlled staging resource that is formed from a subset of memory resources of the shared memory;

managing, using the software-controlled staging resource, data flows from the first memory to the first vector register of the first processor core and data flows from the first memory to the second vector register of the second processor core;

wherein the software-controlled staging resource is a first-in-first-out (FIFO) memory structure along a load section of the first load-store data path or the second load-store data path, and wherein the FIFO memory structure is configured to temporarily store a vector of values received from other memory locations of the shared memory for a threshold number of processor cycles and to subsequently route the vector of values from the FIFO memory structure to the first vector register of the first processor core or the second vector register of the second processor core; and generating, by a matrix computation unit within the first processor core or the second processor core, accumulated values corresponding to the output for the neural network layer using the respective first and third vector values that are routed to the matrix computation unit in parallel along the first load-store data path and the first DMA data path of the shared memory, respectively, in response to performing a subset of the computations to generate the output for the neural network layer; wherein the software-controlled staging resource manages data flows between the first memory and the matrix computation unit, wherein the data flows comprise vector arrays that are derived from the data provided by the first memory.

19. The non-transitory machine-readable storage device of claim 18, wherein the software-controlled staging resource is configured to load data from the shared memory in a first phase, and provide the loaded data to the first or second vector register in a second phase.

20. The non-transitory machine-readable storage device of claim 18, wherein the circuit comprises a plurality of processor cores and the shared memory comprises a plurality of memory resources that are physically distributed about the circuit and the method comprises:

using the plurality of memory resources of the shared memory to exchange data communications between the first memory and each of the plurality of processor cores.

21. The non-transitory machine-readable storage device of claim 20, wherein the shared memory comprises a shared memory control unit and the method comprises:

causing a first portion of resources of the plurality of memory resources to function as a DMA memory unit based on instructions executed by the shared memory control unit; and using a representative DMA function of the first portion of resources to move data between the first memory and each of the first processor core and the second processor core.

22. The non-transitory machine-readable storage device of claim 21, the operations further comprising:

receiving, by a second portion of resources of the plurality of memory resources, the third vector values and the fourth vector values that are routed along the first and second load-store data path respectively;

temporarily storing, using the second portion of resources, the third vector values for a threshold number of processor cycles; and temporarily storing, using the second portion of resources, the fourth vector values for a threshold number of processor cycles.

23. The non-transitory machine-readable storage device of claim 22, the operations further comprising:

providing, using the second portion of resources, the third vector values to the first vector register of the first processor core in response to temporarily storing the third vector values for the threshold number of processor cycles; and providing, using the second portion of resources, the fourth vector values to the second vector register of the second processor core in response to temporarily storing the fourth vector values for the threshold number of processor cycles.

24. The non-transitory machine-readable storage device of claim 18, wherein:

the circuit comprises a vector processing unit intermediate the first memory and the matrix computation unit;
the operations further comprising generating, by the vector processing unit, a vector of activation values from the accumulated values generated by the matrix computation unit; and
the vector of activation values corresponds to the output for the neural network layer.

* * * * *